(12) United States Patent
Ingram-Ogunwumi et al.

(10) Patent No.: US 7,700,163 B2
(45) Date of Patent: Apr. 20, 2010

(54) MICROWAVE PROCESS FOR POROUS CERAMIC FILTERS WITH PASSIVATION AND CATALYST COATINGS

(75) Inventors: Roychelle Sheneen Ingram-Ogunwumi, Painted Post, NY (US); Steven Bolaji Ogunwumi, Painted Post, NY (US); Barbara Anna Oyer, Hornell, NY (US); Paul John Shustack, Elmira, NY (US)

(73) Assignee: Corning Incorporated, Corning, NY (US)

( * ) Notice: Subject to any disclaimer, the term of this patent is extended or adjusted under 35 U.S.C. 154(b) by 404 days.

(21) Appl. No.: 11/261,226

(22) Filed: Oct. 27, 2005

(65) Prior Publication Data

US 2007/0098914 A1 May 3, 2007

(51) Int. Cl.
| | |
|---|---|
| *B05D 3/06* | (2006.01) |
| *B05D 7/14* | (2006.01) |
| *C08J 7/18* | (2006.01) |
| *B32B 3/12* | (2006.01) |
| *B01J 21/04* | (2006.01) |

(52) U.S. Cl. .............. 427/553; 427/532; 427/244; 427/331; 427/372.2; 427/384; 502/159; 502/439; 428/116; 428/307.3

(58) Field of Classification Search ............... 427/532, 427/553, 244, 331, 372.2, 407.1, 384; 502/159, 502/439; 428/116, 307.3
See application file for complete search history.

(56) References Cited

U.S. PATENT DOCUMENTS

| | | | |
|---|---|---|---|
| 3,771,234 A * | 11/1973 | Forster et al. ............... 34/259 |
| 4,055,001 A | 10/1977 | Forster et al. ............... 34/1 |
| 4,483,940 A * | 11/1984 | Ono et al. .................. 502/159 |
| 4,532,228 A | 7/1985 | Golino et al. ............... 502/261 |
| 5,460,854 A * | 10/1995 | Krug ....................... 427/393.6 |
| 6,398,837 B1 * | 6/2002 | Alvin et al. .................. 55/486 |
| 6,541,407 B2 | 4/2003 | Beall et al. .................. 501/119 |
| 6,620,751 B1 | 9/2003 | Ogunwumi ................. 501/134 |
| 6,649,888 B2 | 11/2003 | Ryan et al. .................. 219/634 |
| 6,849,181 B2 | 2/2005 | Ogunwumi et al. ...... 210/510.1 |
| 7,166,555 B2 * | 1/2007 | Shustack et al. ............ 502/159 |
| 7,455,891 B2 * | 11/2008 | Kunz et al. ................. 427/553 |
| 2003/0045423 A1 * | 3/2003 | Dindi et al. ................ 502/302 |
| 2004/0092381 A1 | 5/2004 | Beall et al. ................. 501/134 |
| 2005/0019578 A1 | 1/2005 | Bosteels .................... 428/408 |
| 2005/0037147 A1 * | 2/2005 | Ogunwumi et al. ...... 427/393.6 |
| 2005/0159308 A1 * | 7/2005 | Bliss et al. ................. 502/439 |
| 2005/0191480 A1 | 9/2005 | Tao et al. ................. 428/304.4 |

FOREIGN PATENT DOCUMENTS

JP          63107751 A *  5/1988

* cited by examiner

*Primary Examiner*—Timothy H Meeks
*Assistant Examiner*—Cachet I Sellman
(74) *Attorney, Agent, or Firm*—Joseph M. Homa

(57) ABSTRACT

A method for base-coating a porous ceramic catalyst support includes coating the support with a passivation coating via vacuum infiltration, and subsequently exposing the support to a microwave field to dry the coating and form a polymerized film. The method further includes coating the support with a catalyst coating or washcoat, and subsequently exposing the support to a second microwave field, thereby removing water from the catalyst coating or washcoat.

19 Claims, 1 Drawing Sheet

MICROWAVE PROCESS FOR POROUS CERAMIC FILTERS WITH PASSIVATION AND CATALYST COATINGS

BACKGROUND OF THE INVENTION

The present invention relates to processes for applying catalyst or catalyst support coatings onto ceramic supports. More particularly, the invention relates to methods for coating ceramic substrates with catalyst coatings wherein a pre-coating or passivation step is used to improve the properties of the catalyzed substrates, by reducing catalyst and/or support coating diffusion into the fine pore and microcrack structure of the substrates and to drying the passivation and catalyst coatings subsequent to application.

Recent attention has focused on basic improvements in the design and performance of ceramic wall-flow honeycomb filters for treating diesel exhaust gases to address tightening diesel engine emissions regulations being adopted in the United States and Europe. Design changes allowing for the use of catalyst coatings to control hydrocarbon and/or nitrogen oxide emissions are being implemented along with other improvements. The goal is to develop an improved high-temperature-resistant, high-thermal-shock-resistant, low cost honeycomb soot filter compatible with advanced emissions control catalyst technologies that can replace current high-cost and/or uncatalyzed particulate filters.

Among the filter designs being developed for this application are refractory ceramic oxide filters offering improved resistance to high exhaust temperatures encountered during decarbonizing filter regeneration cycles, as well as to the thermal shock conditions arising during rapid filter heat-up and cool-down in the course of startup and regeneration. Two compositions currently being employed for filter construction are cordierite and aluminum titanate. Examples of advanced cordierite and aluminum titanate compositions utilized within honeycomb filter designs being developed for these applications are disclosed in U.S. Pat. No. 6,541,407, entitled CORDIERITEBODY, U.S. Pat. No. 6,849,181, entitled MULLITE-ALUMINUM TITANATE DIESEL EXHAUST FILTER, and U.S. Pat. No. 6,620,751, entitled STRONTIUM FELDSPAR ALUMINUM TITANATE FOR HIGH TEMPERATURE APPLICATIONS, which are each herein incorporated by reference in their entirety. Other materials being employed for refractory, catalyst-compatible ceramic particulate filters are the refractory alkali zirconium phosphates as well as low-expansion alkali aluminosilicates such as beta-eucryptite and pollucite. Many of these same compositions, and other microcracked ceramic materials such as the calcium aluminates, are being considered for use as flow-through catalyst supports for the control of nitrogen oxide (NOx) emissions from automotive and diesel engines.

Advanced aluminum titanate ceramics are among the most promising candidates for use in diesel exhaust filter applications as these ceramics meet or exceed most specifications for high melting point, high thermal capacity, and low thermal expansion. However, one difficulty encountered with these and other porous ceramics intended to function as particulate filters is the need to maintain both high gas permeability and a low coefficient of thermal expansion throughout the processes involved in depositing catalysts on the filter walls. A general requirement is that a low average linear coefficient of thermal expansion (CTE) for these filters should be maintained. Preferably, increases in CTE resulting from the application of washcoats and catalysts should not exceed $10 \times 10^{-7}/°$ C. averaged over the range from 25-1000° C., and CTE values for the washcoated filters should not exceed $20 \times 10^{-7}/°$ C. over that same temperature range, in order to preserve the thermal shock resistance of the filter. Further, gas permeabilities through the catalyzed filter should be sufficient to maintain pressure drops below 8 kPa at exhaust gas space velocities up to 150,000 $hr^{-1}$ after filter regeneration to remove trapped particulates.

A significant drawback associated with the application of the alumina or other washcoating materials typically employed to support the required emission control catalysts is a substantial increase in CTE and reductions in filter permeability. Present understanding is that during the washcoating or catalyzing process both wall porosity of the filter and the structural micro-cracks (crack widths of 0.1-3 microns) that are present in most of these ceramic materials are frequently filled with the washcoating material. This problem is most pronounced in the case of highly microcracked ceramics such as the aluminum titanates, particularly when the washcoating formulations contain materials of very fine particulate size (e.g., particle diameters in the 0.02-0.1 µm range), thereby facilitating the filling of the microcracks with the washcoating material.

Microcracking is a significant contributor to the low CTEs exhibited by many of these materials, with crack closure during heating considerably moderating the dimensional increases that would otherwise occur. As a result, the filling of these microcracks with washcoating constituents can result in some cases in much higher expansion coefficients e.g., in the range of $40\text{-}50 \times 10^{-7}/°$ C., in the washcoated structures. At these CTE levels the risk of structural damage to the filter under the normal conditions of exhaust filter use is unacceptable.

One approach to the problem of washcoat microcrack filling of conventional flow-through catalyst substrates for gasoline engine emissions control has been the use of so-called passivating coatings prior to the application of the associated catalyst. These passivating coatings are pre-coatings applied to the walls of the ceramic substrates prior to the washcoating that can block the washcoating materials from intruding into the microcrack structure of the ceramic. U.S. Pat. No. 4,532,228, entitled TREATMENT OF MONOLITHIC CATALYST SUPPORTS which is herein incorporated by reference in its entirety, provides some examples of coating materials that can be carbonized or otherwise solidified to provide a washcoat barrier, and then removed after the washcoat has been laid down.

To provide adequate protection against CTE increases in highly microcracked ceramics such as aluminum titanates while simultaneously providing an effective guard against unacceptable reductions in ceramic wall gas permeability certain polymeric barrier layers have been employed as the passivation coating. Specifically, these polymeric barrier layers are composed of mainly polymeric materials with hydrophobic and hydrophilic functional groups that are soluble and/or dispersible in a polar medium and that form a neutral or hydrophilic surface on the substrate, at least in the presence of acidic washcoating media. Examples of specific polymer types with these characteristics include ionene polymers, acid-activated aminoacrylate copolymers, and aliphatic acrylic acid copolymers. Another approach employed towards meeting the above-referenced requirements includes applying the passivation polymer barrier layer to the substrate composed of the hydrocarbon polymer, and thereafter overcoating the polymer barrier with an aqueous dispersion of a selected ceramic washcoating material to provide a ceramic-coated substrate. These approaches toward reducing CTE and maximizing the overall ceramic wall gas permeability are disclosed in U.S. patent application Ser. No. 10/641,638, filed Aug. 14, 2003, and entitled PoROUS CERAMIC FILTER WITH CATALYST COATINGS, which is incorporated in its entirety herein by reference.

Heretofore, the production processes associated with the manufacturing of low CTE, high gas permeable filters employing the application of passivation and catalyst coatings noted above were time intensive and therefore costly procedures. Specifically, a lengthy drying process of 12 to 24 hours is typically employed subsequent to applying the passivation coating to the filter in order to remove water from the coating. The duration of this drying process is a significant factor with respect to how quickly the filters in process may be moved to the subsequent catalyzing step, and ultimately how quickly the overall process may be completed and filters delivered to the marketplace. Further, an additional drying step is accomplished subsequent to the application of the catalyst coating, thereby further increasing the time of the overall manufacturing cycle. Moreover, the drying processes currently utilized typically include the use of convection ovens that are relatively expensive to operate and maintain, and require a large production area to ensure adequate processing capabilities.

A method for applying and drying passivation coatings and catalyst coatings to ceramic supports and particularly diesel emission filters is desired that protects against CTE increases in highly microcracked ceramics while simultaneously providing an effective guard against unacceptable reductions in ceramic wall gas permeability. Further, the method should also decrease the overall manufacturing time of any given filter by substantially reducing the drying time as required in the process, and should moreover decrease the overall amount of passivation agent required during manufacture, thereby providing an overall cost savings and a reduction to the back pressure associated with the operation of any given filter.

SUMMARY OF THE INVENTION

The present invention provides improved passivating coatings and catalyst coating systems offering particular advantages for the processing of high porosity, highly microcracked ceramic honeycomb filters. The passivating coating systems are based on families of polymer coatings that effectively cover or pre-fill microcracks and micropores during the washcoating process, while at the same time protecting the gas permeability of the high porosity ceramic walls of the filters. The preferred systems can also improve the washcoating characteristics of the substrate to enable high washcoat and catalyst loadings to be applied. Further, these preferred systems provide an improved drying process of the passivation coating and an improved drying process of the catalyst coating or washcoat. Finally, these systems are sufficiently durable to maintain an effective barrier function throughout the various steps of the washcoating process, yet are readily removable by heating after washcoating without damaging disruption of the overlying ceramic material coatings, or any loss of washcoat bonding or adhesion to ceramic filter body.

In one important aspect, the invention includes a method for protecting a porous ceramic substrate having a microporous or microcracked structure from microstructural infiltration by microparticles present in a coating medium which comprises the step of applying to the substrate a "passivation" polymer barrier layer composed of a hydrocarbon polymer with hydrophilic and hydrophobic functional groups that is both soluble or dispersible in a polar medium and that forms a neutral or hydrophilic surface on the substrate, at least in the presence of acidic washcoating media, and drying that passivation polymer barrier layer with a microwave field to remove water from the passivation layer. Examples of specific groups with these characteristics from which the barrier layer may be selected, include polyvinyl alcohols, polyacrylic acids, polyacrylic amines, polyvinyl alcohol/vinyl amine copolymers, polyvinyl alcohol/vinyl formamide copolymers, gelatin, ionene polymers, acid-activated aminoacrylate copolymers, and aliphatic acrylic acid copolymers. The step of applying the microwave field to remove water from the passivation coating protects against CTE increases, while simultaneously guarding against reduction of gas permeability of the wall ceramic substrate. Further, the application of the microwave field significantly reduces the overall drytime required to remove the water from the passivation coating.

In a further aspect, the invention includes an improved method for washcoating a porous ceramic substrate with a layer of a selected ceramic material, and drying the washcoating by applying a microwave field to remove water from the washcoating. That method includes the steps of applying to the substrate a "passivation" polymer barrier layer composed of a hydrocarbon polymer as described above to provide a polymer-coated ceramic substrate, and thereafter over-coating the polymer-coated substrate with an aqueous dispersion of the selected ceramic washcoating material to provide a ceramic-coated substrate. Thereafter, the ceramic-coated substrate is subjected to a microwave field to dry and bond the ceramic washcoat material to the substrate.

The preferred polymeric ionenes, acrylic acid copolymers, and acid-activated aminoacrylate copolymers forming these barrier coatings may generally be characterized as water-soluble or water-dispersible polymers that combine hydrophilic and hydrophobic behavior in the acidic environment typical of aqueous washcoating media. Coatings of these polymers not only provide durable barriers against microparticulate intrusion into microporous ceramic substrates, but also form surfaces of neutral or hydrophilic character in the presence of typical washcoating preparations, surfaces that can in some cases improve coating efficiency during the washcoating stage of the process. And finally, the polymers can be entirely removed from the interconnecting microchannel structure after washcoating by thermal decomposition at only modest temperatures, and without disruption of the overlying washcoat.

Without intending to be bound by theory, it is presently thought that these polymer coatings partially preoccupy and block, by capillary force, both the crack structure of microcracked ceramic substrates and the interconnecting microchannel (interconnected microporous) wall structure of ceramic substrates being developed for advanced wall flow particulate filters. The latter will thus demonstrate, after washcoating, the combination of efficient particulate filtration and high gas permeability necessary for effective performance as engine exhaust filtration devices. Further as polymer is removed in the course of washcoat drying and/or catalyst activation, porosity previously not accessible to catalyst washcoat particles could become available and thus contribute to the improvement of the overall permeability and catalytic activity. These polymer coatings leave open a sufficient volume of large pores such that effective deposition of the active catalysts needed for highly active catalyzed particulate exhaust filters can routinely be achieved.

DESCRIPTION OF THE DRAWINGS

The invention is hereinafter more fully described with reference to the appended drawings, wherein.

DETAILED DESCRIPTION

The use of catalysts in combination with ceramic exhaust particulate filters for engine exhaust emissions control presents special catalysts coating concerns. Specifically, this is because the interconnecting wall porosity of the ceramic filter must survive the catalyst coating process in order to preserve the exhaust gas pressure drop requirements of the exhaust system. Further, the catalyst coating process must be achieved quickly and economically to provide a market feasible filter.

The present inventive process involves the processing of a porous ceramic catalyst support, such as a diesel exhaust gas particulate trap or filter, as discussed above, and comprises coating the support with a passivation or barrier coating, which is preferably applied via vacuum infiltration, and subsequently exposing the support to an electromagnetic field, preferably a microwave field. The process further comprises coating the support with a catalyst coating or washcoat, and subsequent exposing the support to a second electromagnetic field, again preferably a microwave field. While it is required that the passivation and catalyst coatings be microwave active, it is preferable that the passivation material and catalyst coatings each have a microwave polarizable group or are applied within a medium or mixtures that may be heated via microwave. Further, the material of the support may also be susceptible to microwave such that in the case of a filter application a microwave field may be used to indirectly heat the passivation material or catalyst washcoat, such as those comprising alkali zirconium phosphates, niobates, SiC, and perovskite. The passivation and catalyst coating and processes as described herein each require heating and/or drying subsequent to application of the particular coating.

Figure 1:
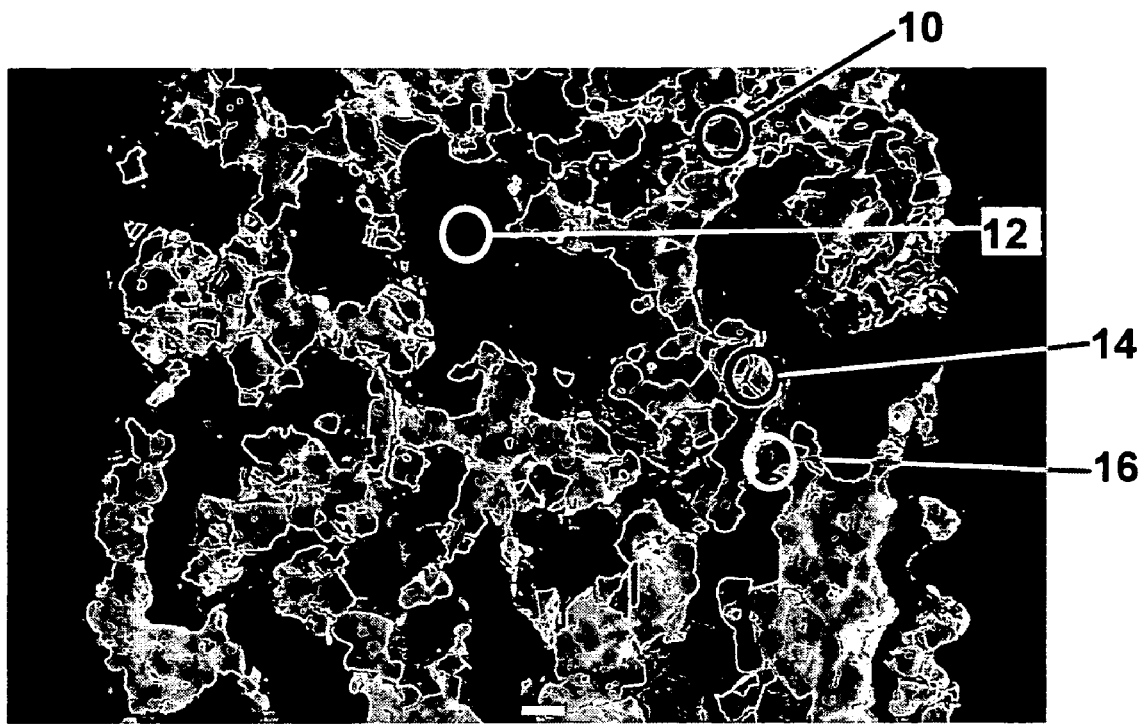
FIG. 1 is an electron photomicrograph of a cross-section of a porous ceramic material for treatment in accordance with the invention.

An example of the pore structure within the walls of a porous ceramic honeycomb of aluminum titanate composition, such as that utilized to construct a diesel filter, is illustrated in FIG. 1 of the drawings, which is a scanning electron photomicrograph of a cross-section of a typical wall wherein the white bar represents a dimension of 20 µm. A typical aluminum titanate crystalline domain within that wall is indicated at 10, and a typical large pore opening within which active catalyst may reside is indicated at 12. In this particular ceramic, crystalline aluminum titanate occupies about 60% by volume of the ceramic while the volumes of the larger pores make up the remaining 40% of the volume of the material.

Smaller features in FIG. 1 include microcracks such as a plurality of cracks 14 formed between aluminum titanate crystalline domains in the ceramic and microchannels such as a plurality of channels 16 interconnecting the larger pore spaces within the ceramic. The latter typically have diameters in the 1-10 micron range and thus are easily filled by washcoat particulates. This microcracked, microchanneled crystalline structure is characteristic of ceramic honeycombs comprising aluminum titanate as the predominant crystalline phase, as well as other ceramics designed to exhibit permeabilities appropriate for use as wall flow filter materials. A preferred substrate is one wherein aluminum titanate constitutes the principal crystalline phase, i.e., a crystalline phase making up more than 50% by weight of the structure.

The micropores and microcracks in FIG. 1 represent the regions of the material into which washcoat penetration is to be avoided. In cases where a catalyst washcoat is applied directly to ceramic walls featuring microcrack and micropore morphologies such as shown in FIG. 1, large increases in both thermal expansion and filter pressure drop are exhibited by the washcoated filters, due to washcoat penetration into these microstructural features. As discussed above, various passivation coatings may be employed to prevent washcoat penetration into the microstructural features of the treated materials.

Polyvinyl alcohol/vinyl amine (PVOH/VAM), polyvinyl alcohol/vinyl formamide (PVOH/VF) copolymers or gelatins are particularly well suited for providing passivation or barrier coatings on porous ceramic catalyst support materials because they are highly compatible with conventional washcoating and catalyst coating materials and processes. These barrier coating materials form aqueous solutions or suspensions of relatively low viscosity that fully penetrate the pore structures of porous, microcracked ceramic substrates. In addition, the dried coatings are hydrophilic and thus easily wetted by such washcoating and catalyst coating preparations, so that they do not interfere with the distribution of such preparations on the catalyst supports. Adequate amounts of the washcoat (catalyst) materials can be easily deposited over the dried barrier coatings using conventional procedures.

Any of a wide variety of copolymer and gelatin solutions of the kind above described can be employed. Among the gelatins that may be used are those derived from sources such as cattle hides, cattle bones, pork skin, and fish skin. The gelatin can be Type A or Type B and be of any Bloom value. Gelatin of low ion content, e.g. photographic gelatin grades, are preferred. Gelatins of low or zero Bloom value are also preferred as they eliminate the need for heating during dissolution or processing. A particularly preferred gelatin is High Molecular Weight Fish Gelatin from Norland Products, Inc. of Cransbury, N.J., USA. The use of gelatin solutions as passivation coatings is described in detail in U.S. patent application Ser. No. 11/057,911, entitled Coated Ceramic Catalyst Supports and Method, which is incorporated herein by reference in its entirety.

PVOH/VAM and PVOH/VF copolymers capable of forming flowable aqueous barrier coating solutions are commercially available over a relatively wide range of molecular weights. Commercially available copolymers over a range of molecular weight from about 10,000 to about 140,000 are particularly suitable. The amounts of vinyl amine or vinyl formamide present in the copolymers may also be varied to meet the requirements of specific applications. Specific examples of commercially available copolymers include Erkol™ M6, M12, M6i, and M12i copolymers, commercially available from Erkol, S.A., Tarragona, ES. The use of copolymers within passivation coatings is described in detail in U.S. patent application Ser. No. 11/057,911 as noted above.

Although not required, chemical crosslinkers may be added to these liquid barrier coating formulations where the conditions to be encountered in washcoating or catalyst coating could cause harmful barrier coating interactions. When added to the aqueous polymer solutions, these crosslinkers cause the polymers to crosslink during the drying process, significantly decreasing the water solubility of the dried coatings. Reduced water solubility reduces the possibility of barrier coating migration during washcoating, e.g., copolymer extraction from the barrier coating into the washcoat or catalyst coating that could result in reduced catalyst efficiency. At the same time, any possible dissolution of the copolymer from microporous or microcracked regions of the ceramic that might permit particle intrusion during washcoating or catalyzation can be minimized.

Suitable crosslinking agents are those that contain functional groups that are reactive with one or more of the functional groups on the base passivation gelatin or copolymer. Particularly useful agents are those that will not facilitate crosslinking until the passivation coating liquid has been deposited onto the porous ceramic substrate. Formulations of crosslinkers and base barrier coating materials that can be blended and stored as a one-part composition with little or no crosslinking during shipping and storage offer advantages, but two-part compositions where the copolymer and crosslinker are kept separate and then blended when needed are also suitable.

Particularly suitable cross-linkers are materials that contain two or more functional groups that are capable of reacting with the functional groups on the base gelatin or copolymer barrier materials under the conditions of use. In the case of gelatin-based barrier coating formulations, the cross-linker should include groups capable of interacting with carboxyl, amino, alcohol, and phenolic functional groups along the protein polymer chain, while in the case of PVOH/VAM copolymer formulations the agents should effectively interact with pendant hydroxyl and/or amino functional groups.

Preferred cross-linkable polymers include water-soluble polymeric ionenes, such as the amine-functional water-soluble ionenes. When properly cross-linked, these polymers provide particularly durable and appropriately targeted barriers against microparticulate intrusion into ceramic micropores and microchannels, yet retain surfaces of neutral or hydrophilic character in the presence of typical aqueous washcoating or catalyst preparations so that they do not interfere with the efficiency of catalyst or washcoat deposition from those solutions. Moreover, the cross-linked barrier coatings that form from these polymers can be entirely removed from the interconnecting microchannel structure of ceramic materials by thermal decomposition at only modest temperatures, without residues and without disruption of the overlying washcoat. A detailed description of crosslinking agents and crosslinking polymers is provided in U.S. patent application Ser. No. 11/057,911, as noted above, and U.S. Patent Application Publication No. 2005/0191480 A1 entitled PorOUS CERAMIC FILTERS WITH CATALYST COATINGS which is incorporated herein by reference in its entirety.

The compatibility of conventional organic passivating coatings with alumina-containing solutions or slurries that are generally acidic are not without certain drawbacks. Typical alumina washcoating formulations are gel solutions comprising alumina or alumina precursors of 2-5 micrometer average particle size in acidic aqueous media of pH 3-4. Some of the known compositions used for microcrack barrier coatings consist of hydrophobic, covalently bonded, straight-$CH_2$-chain polymers that do not easily form homogeneous passivation layers on hydrophilic ceramic surfaces. Further, these polymers typically do not exhibit hydrophilic surfaces as deposited.

Further, while simple hydrophilicity or water solubility of a polymer can be advantageous from an ease-of-processing standpoint, this property may not be sufficient to insure an effective barrier coating system for protecting microcracked ceramics. Water-soluble coatings have a natural tendency to re-dissolve when exposed to washcoating solutions, exposing the microcracks and microchannels in the ceramic to washcoating penetration during deposition or, especially, during the washcoat drying process. The hydrophobic groups present in most polymers tend to surface-segregate on drying, making the resulting films more hydrophobic than desired and thereby reducing the extent of washcoating pickup achievable from water-based washcoating suspensions.

Ionene polymers constitute a family of high-charge-density linear polymers that avoid both excessive hydrophobicity and high solubility in aqueous washcoating media. These polymers are characterized by the presence of dimethylammonium charge centers interconnected by alternating alkyl chain segments containing x and y methylene groups. The preferred ionene polymers are water soluble linear polymers incorporating regular quaternary ammonium groups associated with chloride counter-ions that impart high charge density to the polymer chain, beneficially affecting both polymer/substrate and polymer/washcoat interactions during passivation and washcoating. The applied polymer coatings are thought to interact with aluminum-containing sol-gel washcoating media in a manner that promotes the agglomeration of nano-washcoat particles within the pores of the ceramic. If present, such agglomeration would likely increase average washcoat particle size and thereby reduce alumina diffusion into microcracks and microchannels in the ceramic.

A second class of polymeric compounds exhibiting both excellent compatibility with conventional washcoating slurries and a high degree of protection from the washcoat microcrack and micropore penetrations that cause increased substrate CTE are the acid-activated aminoacrylate copolymers present in certain water-based acrylic copolymer emulsions. The acid-activated copolymers present in such emulsions comprise a (meth)acrylic backbone incorporating both hydrophobic and hydrophilic components, and also an amino group that responds effectively to the changes in pH that occur during the application of typical washcoats.

Yet a third barrier coating system offering many of the benefits of the ionene and acrylate copolymer systems is based on the aliphatic acrylic acid copolymers, and is typified by the ethylene acrylic acid wax copolymers. These polymers are also of mixed hydrophilic-hydrophobic character, and available in a range of molecular weights. These polymers are sold commercially as aqueous wax dispersions, and can conveniently be directly applied to porous ceramic substrates to provide barrier layers effective to limit washcoat microcrack penetration. The coating weights required for effective microcrack protection are similar to those useful for ionenes and aminoacrylate copolymers, and can be achieved in a single coating step. Vacuum impregnation is preferred but not required, since viscosities suitable for ambient dip-coating can easily be achieved by dilution. Recoating between drying steps is effective, enabling the use of multiple polymer layers wherein desired.

An important characteristic of all three types of polymer barrier coatings described above is that they can effectively limit the reductions in exhaust gas permeability necessarily arising from the application of washcoating layers to microporous ceramic wall flow filters. At least some blockage of wall pore structure is unavoidable, but the resulting increases in backpressure, if moderate, can be considered an acceptable tradeoff for the catalytic activity imparted through washcoating and catalyzation processes. Barrier coatings of the above-described polymeric materials produce at most only slight increases, and normally no increases, in washcoated filter pressure drops when compared with washcoated filters produced in no polymer passivation treatment. A more detailed description of these three types of polymer barrier coatings is provided in U.S. Patent Application Publication No. 2005/0037147 A1 entitled PorOUS CERAMIC FILTERS WITH CATALYST COATINGS which is incorporated herein by reference in its entirety.

A more detailed understanding of the drying and/or heating aspect of the present invention is made by way of a general example. One example of a passivation agent suitable for the present invention comes from the acrylic acid resin series and specifically involves ethylene acrylic acid was emulsion ("4983R"), as commercially available from Michelman, Cincinnati, Ohio, USA, as Michelman Prime 4983R. This particular emulsion is provided in an approximate 30 micron size, with a molecular weight of 30,000 g/mol, and has the structure:

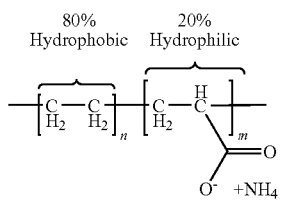

The solution as used for passivation in the present example is diluted to about 12%, with about 2% to about 3% isopropyl alcohol added to decrease surface tension. In order to attain a suitable CTE, the dry weight of the 4983R emulsion is between about 1.5 and about 3%. Due to the relative low viscosity of the solution, the sample support may be coated by hand dipping the support into the emulsion, however, it is preferable to use vacuum infiltration during the coating step. By using vacuum infiltration, all trapped air is removed from the support, thereby allowing complete passivation of all regions of the support.

A drying step must then be applied to the support in order to ensure the formulation of a continuous organic film after application of the passivation solution and to remove water therefrom. Heretofore, an oven drying procedure has been employed within the temperature range of approximately 90-110 C. This conventional drying procedure required a significant amount of time to complete. For example, drying relatively large samples within the 2 inch by 6 inch to 5.66 inch by 5 inch range required between 12 to 24 hours drying time after application of the passivation coating in order to properly dry. By applying the present invention microwave drying, a typical passivation agent may be sufficiently dried in less than 30 minutes for the 2 inch by 6 inch support samples, and less than 60 minutes for the 5.66 inch by 6 inch support samples. In this particular example, the passivation emulsion coated support is exposed to a 2.45 MHz (1300 W) microwave field. Preferably, the microwave field is applied within the range of between 1 MHz to 10 MHz, and more preferably is applied within the range of between 1 MHz to 5 MHz, as a higher wavelength increases the penetration depth and drying efficiency.

Subsequent to exposing the passivation emulsion coated support to the microwave field, the support is washcoated or catalyzed. The washcoat utilized in the present example is Al-20, as available from Nyacol of Ashland, Md., USA under the name Al-20-Nyacol. Al-20 is a liquid colloidal alumina preparation which can be converted to a gamma alumina washcoating following the heat treatment. As noted above with respect to the passivation coating, the washcoat Al-20 was applied to the support by hand dipping, however, the washcoat application is preferably applied via the vacuum infiltration process. Other washcoat materials may also be utilized, including $Al_2O_3$, $TiO_2$, $ZrO_2$, $CeO_2$, and $La_2O_3$, catalyst metals from the transition metal series of the periodical table, alkali metals, alkali earth metals, spinel, zeolites and perovkites.

Similar to the drying step described above with respect to the passivation coating, previous processes for drying catalyst or washcoating involved conventional oven drying procedures employed within the temperature range of approximately 90-110° C. These conventional drying procedures also required a significant amount of time to complete, with drying times compatible with those associate with drying of the passivation coating. By applying microwave drying in accordance with the present invention, a typical washcoating may be sufficiently dried in less that 30 minutes for the 2 inch by 6 inch support samples, and less than 60 minutes for the 5.66 inch by 6 inch support samples. In this particular example, the washcoated support is exposed to 2.45 MHz (1300 W) microwave energy. Preferably, the microwave field is applied within a range of between 1 MHz to 10 GHz, and more preferably is applied within a range of 1 MHz to 5 GHz as a higher wavelength increases the penetration depth and drying efficiency. The preferred power range is between 3 Kwatts and 10 Kwatts per 100 pounds of material.

The water content of the washcoating subsequent to drying is preferably less than or equal to 1%, and more preferably less than or equal to 0.01% to ensure proper catalyst adhesion and prevent loss of catalyst materials during subsequent firing steps. As noted above, the present inventive process is also applicable to the crosslinkable organic polymers as discussed above.

EXAMPLE 1

Microwave Drying of Passivation and Catalyst Washcoat Coatings

For the present experiment, a microwave oven was used for the passivation drying step as well as the catalyst washcoat drying step. CTE samples of a porous aluminum titanate ceramic measuring 1.5"×0.5" were used for the experiments. The porosity of the aluminum titanate sample material was 47.59%, with the specific sample composition described in U.S. Patent Application Publication No. 2004/0092381 A1, filed Jul. 24, 2003, and entitled ALUMINUM TITANATE-BASED CERAMIC ARTICLE. The CTE of the sample at 1000° C. was $8.7 \times 10^{-7}$/° C. This CTE value is reported as 8.7, as noted in Table 1, and a similar denotation is used hereinafter to report all other CTE values. Without any passivation agent, the resulting CTE was relatively high (44) after the application of the washcoat layer.

TABLE 1

| SAMPLE (1 × 1) | % PASSIVATION | AL-20 (G/L) | CTE 1000 C. |
|---|---|---|---|
| Control | 0 | 0 | 8.7 |
| Control + AL-20 | 0 | 78.85 | 44 |
| Ionene (mw) | 2.4 | 71.68 | 11.4 |
| Ionene (mw) | 3.2 | 48 | 11.4 |
| Ionene (oven) | 3 | 40 | 17.9 |
| 4983R (oven) | 1.7 | 7.17 | 12.6 |
| 4983R (mw) | 1 | 10.75 | 11.2 |
| 4983R (mw) | 2.25 | 25.1 | 10.6 |

Ionene was used as the treatment for the next three data in the series. As observed in the table, when ionene was used and oven dried ("oven"), the CTE was significantly higher than when microwave ("mw") drying was implemented. The advantage of the microwave is seen clearly with the lower CTE of the sample with lower ionene treatment (2.4%) and high washcoat loading of (71.68%) in comparison to the other ionene treated samples that were conventionally oven dried.

The next series of data shown in Table 1 represents the sample treated with the acrylic acid (4983R). This data also shows the CTE result of microwave heated samples to be lower than those treated with the oven. For the microwave procedure, the samples were dried for approximately 5 minutes at full power. Oven samples were dried between 30 minutes and one hour. After drying, a surrogate washcoat (AL-20-NYACOL) was applied and the material dried again using an oven or microwave. After the drying step, the samples are fired at 550° C. for three hours to remove the treatment and stabilize the washcoat. The fired sample was then sent for CTE measurements.

The next set of examples summarized in Table 2 demonstrates the advantage of utilizing the microwave drying process for both the passivation agent and the catalyst washcoat. A 1"×2" aluminum titanate sample was coated with 4983R (2%). The sample was dried in the microwave at full power for a total of five minutes. Two portions (1.5"×0.5") were cut from the sample after the microwave drying and washcoated with AL-20. After the washcoat, sample 21A was dried in the microwave for another 5 minutes at full power. Sample 21B was dried in the oven at 120° C. over night. The next day both samples were fired at 550° C. for three hours. The CTE results are shown below in Table 2. The microwave dried sample after the washcoat application had a lower CTE versus the conventional oven dried sample.

TABLE 2

| SAMPLE (4983R) | % PASSIVATION | AL-20 (G/L) | CTE 1000 C. |
|---|---|---|---|
| 1910-21A | 2 | 36 | 8.7 |
| 1910-21B | 2 | 28 | 10 |

Next, larger samples were examined, including 2"×6" filter samples that were treated and washcoated using ionene. The results are shown in Table 3.

TABLE 3

| SAMPLE (2 × 6) | % PASSIVATION | AL-20 (G/L) | CTE 1000 C. |
|---|---|---|---|
| 7325-10B-F71(oven)-125c-Ionene/AL-20 | 2.4 | 25.18 | 15.3 |
| 7325-54A-F71(mw)-Ionene/AL-20 | 2.5 | 36.5 | 11.9 |

While both samples were treated with ionene using a vacuum infiltration technique, a hand dipped process could be used as well. The oven sample was placed in an oven at 125° C. over night. The microwave sample was heated for 10 minutes at full power. After the application of the AL-20, the oven sample was placed in the oven again at 120° C. overnight. The microwave sample was dried for a total of 20 minutes. The drying was done at an increment of 5 minutes where the first 5 minutes was dried at full power, the next 5 minutes was also done at full power, then the power was reduced to 50% for the next two 5 minute segments. After drying, the washcoated samples are fired at 550° C. for three hours. Once more, the microwave process resulted in a lower CTE. While not intending to be bound by theory, it is speculated that the nature of the film formed is more uniform from microwave heating and more efficient for the fine microcracks. To avoid overheating, the microwave power should be adjusted as necessary for larger samples. The microwave unit used for the experiment was a commercial 2.45 MHz Panasonic (1300 W) microwave. The microwave is modified with an Omega Inconel sheath thermocouple (TJ36-CAIN-18U-12) to monitor the temperature of the sample.

By using microwave drying, an improvement in the porosity is observed, which would thereby result in a lower back pressure penalty when applied to diesel filters as supports. The porosity data for the ionene treated samples discussed above is presented in Table 4. The data shows that by employing a microwave drying process, the resulting porosity is approximately 5% higher than a part that had been dried in the oven.

TABLE 4

| SAMPLE | % PASSIV | AL-20 (G/L) | CTE 1000 C. | Porosity % | MPS | Total Int. Vol. (ml/g) |
|---|---|---|---|---|---|---|
| Ionene (mw-15) | 2.4 | 71.68 | 11.4 | 48.5957 | 12.4013 | 0.2966 |
| Ionene (mw-16) | 3.2 | 48 | 11.4 | 49.2996 | 12.5779 | 0.3006 |
| Ionene (oven-17) | 3 | 40 | 17.9 | 44.4728 | 9.9411 | 0.2491 |

Despite the high washcoat loading of the sample dried using the microwave, the resultant porosities and MPS values are larger than the sample dried using the oven (49% vs 45%) and (12.4 vs 10 µm). The intrusion volume (Table 5) for the sample dried using the microwave was also significantly higher than the sample dried using the oven.

TABLE 5

| Sample ID | % Porosity | Total Intrusion Volume ml/g | Median Pore Diamtr (d50) um |
|---|---|---|---|
| 7325-10B-71 Ionene/AL20 Oven 125C | 37.7516 | 0.1957 | 7.6728 |
| 7325-54A-71 Ionene/AL20 Microwave | 41.7138 | 0.2218 | 7.9708 |

Figure 2:
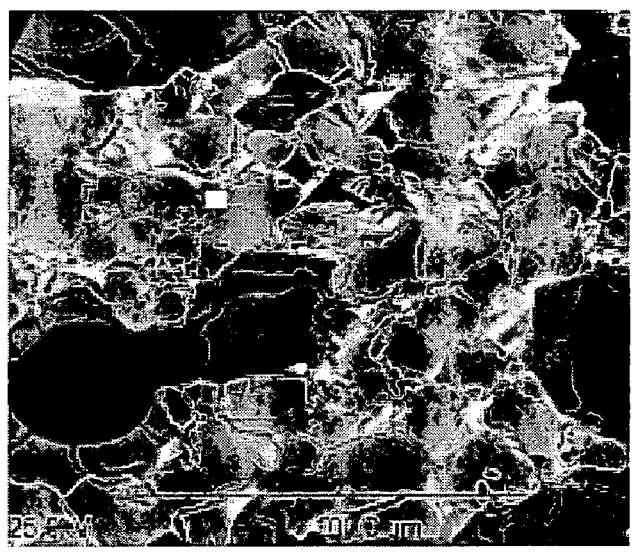
FIG. 2 is an electron photomicrograph of a cross section of a porous material treated in accordance with the invention.

A similar result is observed and reported for the 2"×6" samples, wherein the microwave-processed sample has a higher porosity, MPS and intrusion volume than the oven treated sample. The scanning election photomicrograph of FIG. 2 illustrates the location of the washcoating within the porosity of the sample as desired.

EXAMPLE 2

Microwave Drying of Passivation and Catalyst Washcoat Coatings

Microwave drying is further evaluated for the case of a passivation coating formed from a water based solution of a polyvinyl alcohol/polyvinyl amine (PVOH/VAM) copolymer mixed with a polycarbodiimide crosslinker, a solution that is also effective for the treatment of microcracked porous ceramic filters to preserve their low CTE on washcoating/catalyzing. Studies of thermal crosslinking for this passivation coating system typically indicate that completion of the crosslinking reaction takes >31 hours at 100° C., approximately 6½ hours at 125° C., and approximately 1½ hours at 150° C.

For the purpose of expediting crosslinking and drying to improve process throughput, studies are undertaken employing a microwave oven to affect the drying/crosslinking reaction for this passivation coating system. Three 2"×6" porous ceramic filters composed of an aluminum titanate ceramic are weighed and then vacuum infiltrated with the PVOH/VAM solution. Following infiltration the filters are re-weighed and then microwave-heated for various time periods in a Panasonic Model NN-S543BFR 1300W microwave oven equipped with a rotisserie.

The thus-treated filters are again re-weighed and then washcoated with Nyacol AL-20 and conventionally oven-dried to apply alumina washcoats thereto. Finally, washcoat loadings and CTE increases are measured.

Table 6 below includes representative results for such tests, along with results for a similar aluminum titanate honeycomb incorporating an oven-dried passivation coating in accordance with prior practice. Included in Table 6 for each of the numbered samples reported are the weight percentage of passivation coating applied, the weights of the applied alumina washcoatings in grams, and the changes in CTE (points of increase times $10^{-7}/°$ C.) and filter pressure drop (increase factor) observed following washcoating. Notably, the changes in CTE reported for the microwave-treated samples are values measured for core portions of the honeycombs, which are generally higher than the values measured for edge sections honeycombs, are due most likely to a less than optimal but easily correctable power uniformity in the applied microwave fields.

The changes in filter pressure drop and coefficient of thermal expansion resulting from either 5½ or 6½ minute microwave processing are comparable to the corresponding values observed for filters thermally dried for 24 hours at 100° C. in a conventional oven, and are again far less than those observed for unpassivated filters (the later typically exhibiting CTE increases to the range of 40 to 50 ($\times 10^{-7}/°$ C.) point range after washcoating). Thus microwave passivation-coat drying achieves nearly the CTE and pressure drop protection in a 6½ minute timeframe that is achieved by thermal baking at 100° C. for 24 hours.

gelatin, ionene polymers having a quaternary ammonium group, acid-activated aminoacrylate copolymers, and aliphatic acrylic acid wax copolymers to form a coated support; and exposing the support to a first microwave field to dry the coating and form a polymerized film.

2. The method of claim 1, wherein the ceramic support is exposed to the first microwave field until the dry weight of the at least one coating material is within the range of from about 1.5% to about 3.0%.

3. The method of claim 1, wherein the first microwave field is applied for less than or equal to about 60 minutes.

4. The method of claim 1, wherein the first microwave field is within a range of from about 1 MHz to about 10 GHz.

5. The method of claim 4, wherein the first microwave is within a range of from about 1 MHz to about 5 GHz.

6. The method of claim 1, wherein the step of applying the liquid mixture to the support includes vacuum infiltration.

7. The method of claim 1, further including:
applying to the ceramic support a catalyst liquid mixture comprising water, at least one high surface area washcoat material within the range of about 10 m2/g to about 300 m2/g selected from the group consisting of: Al2O3, TiO2, SiO2, ZrO2, CeO2, La2O3, spinel, zedites perovkites, an alkali metal and an alkali earth metal, and at least one catalyst metal from the transition metal series of the periodic table subsequent to exposing the support to the first microwave field.

8. The method of claim 7, wherein the support is exposed to the second microwave field until the water content of the at least one catalyst liquid mixture is less than or equal to about 1%.

9. The method of claim 8, wherein the support is exposed to the second microwave field until the water content of the at least one catalyst liquid mixture is less than or equal to about 0.01%.

10. The method of claim 7, wherein the second microwave is within the range of from about 3 Kwatts to about 10 Kwatts per 100 pounds of support.

11. The method of claim 7, wherein the second microwave field is within a range of from about 1 MHz to about 10 GHz.

12. The method of claim 11, wherein the second microwave field is within the range of from about 1 MHz to about 5 GHz.

13. The method of claim 11, wherein the second microwave field is applied for less than or equal to about 60 minutes to reach a dry weight of the catalyst liquid mixture.

TABLE 9

| SAMPLE NO. | DRYING (m = mw) (c = oven) | PASSIV. COAT (%) | Wt. AL-20 (G/L) | CTE Change | Pressure Drop Change |
|---|---|---|---|---|---|
| 133 | mw: 5 min; 3.5 min | 3.89 | 48.01 | 9.9 | 1.27x |
| 125 | mw: 5.5 min | 4.0 | 44.97 | 6.0 | 1.27x |
| 132 | mw: 6.5 min | 4.02 | 49.18 | 6.9 | 1.33x |
| 72 (Comp). | c: 24 hr.@ 100° C. | 3.77 | 48.75 | 4.5 | 1.24x |

The invention claimed is:

1. A method for base-coating a porous ceramic catalyst support prior to applying a catalyst or catalyst support coating thereto comprising the steps of:
applying to the support a coating of a liquid mixture comprising water and at least one coating material selected from the group consisting of: polyvinyl copolymers, 14. The method of claim 1, further including:
Providing a ceramic honeycomb as the porous ceramic catalyst support, wherein the ceramic honeycomb comprises at least one material selected from the group consisting of: cordierite, aluminum titanate, alkali zirconium phosphates, calcium aluminates and alkali aluminosilicates, niobates, and perovskite.

15. The method of claim 1 wherein the liquid mixture further comprises a crosslinking agent, and the exposure to the first microwave field cross-links the polymerized film.

16. The method of claim 1 wherein the at least one coating material is selected from the group consisting of gelatin, polyvinyl alcohol/vinyl amine copolymers, polyvinyl alcohol/vinyl formamide copolymers, acid-activated aminoacrylate copolymers, and aliphatic acrylic acid wax copolymers.

17. A method for base-coating a porous ceramic catalyst support prior to applying a catalyst or catalyst support coating thereto comprising the steps of:

applying to the support a coating of a liquid mixture comprising water and at least one coating material selected from the group consisting of copolymers having hydrophilic and hydrophobic functional groups, and gelatin; and exposing the support to a first microwave field to dry the coating and form a polymerized film.

18. The method of claim 17 wherein the liquid mixture further comprises a crosslinking agent, and the polymerized film is cross-linked after exposure to the first microwave field.

19. The method of claim 17 wherein the copolymers are selected from the group consisting of: polyvinyl alcohol/vinyl amine copolymers, polyvinyl alcohol/vinyl formamide copolymers, acid-activated aininoacrylate copolymers, and aliphatic acrylic acid wax copolymers.

* * * * *